March 23, 1937.    G. H. HUNT    2,074,727
BRAKE
Filed Sept. 16, 1933    2 Sheets-Sheet 1
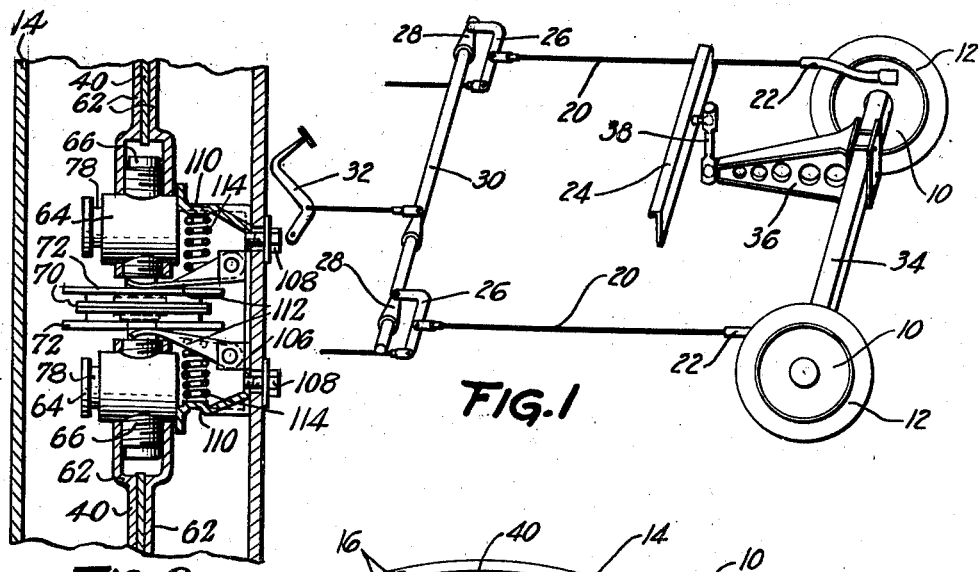
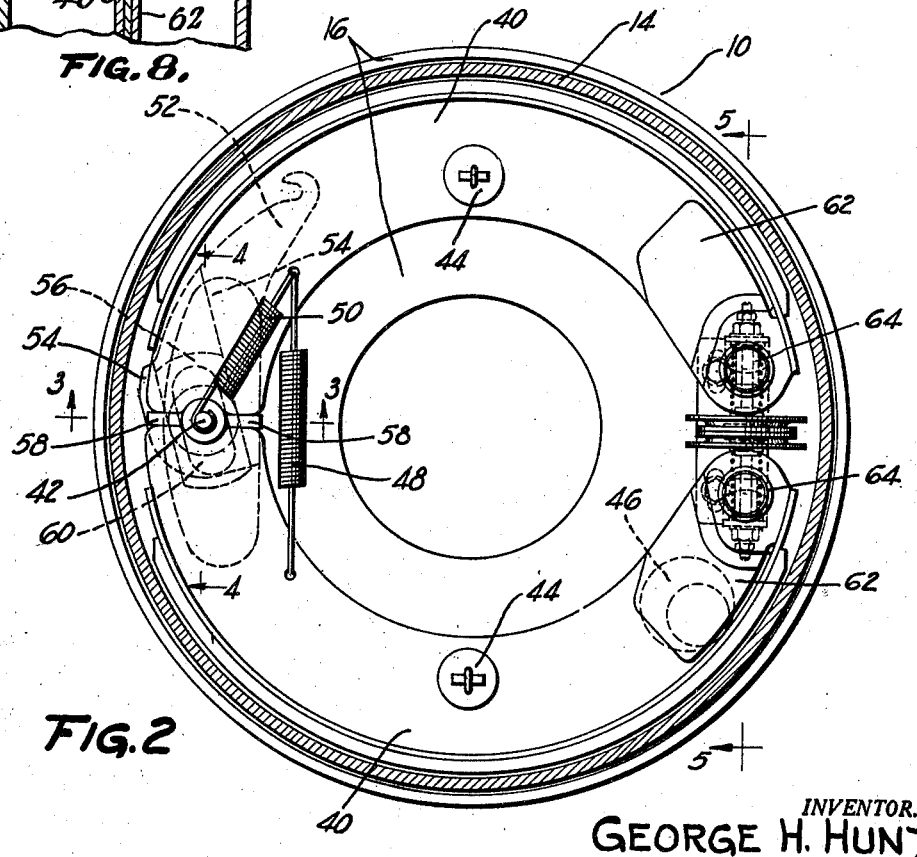
INVENTOR.
GEORGE H. HUNT
BY
ATTORNEY March 23, 1937. G. H. HUNT 2,074,727
BRAKE
Filed Sept. 16, 1933 2 Sheets-Sheet 2
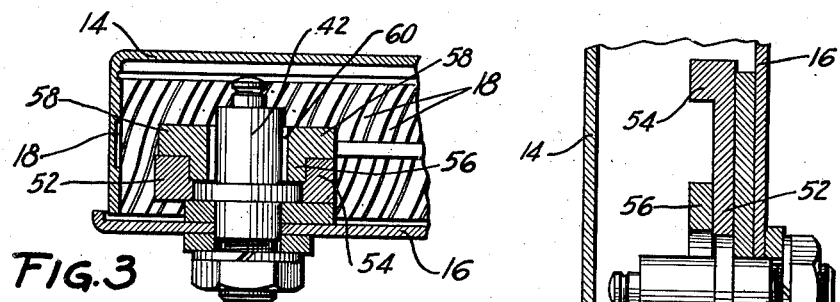
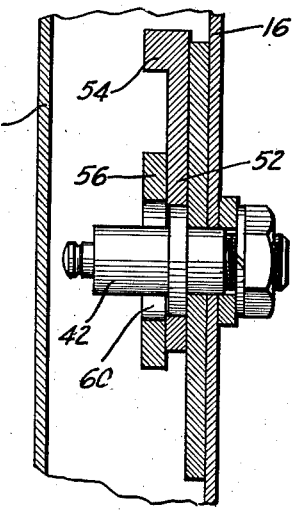
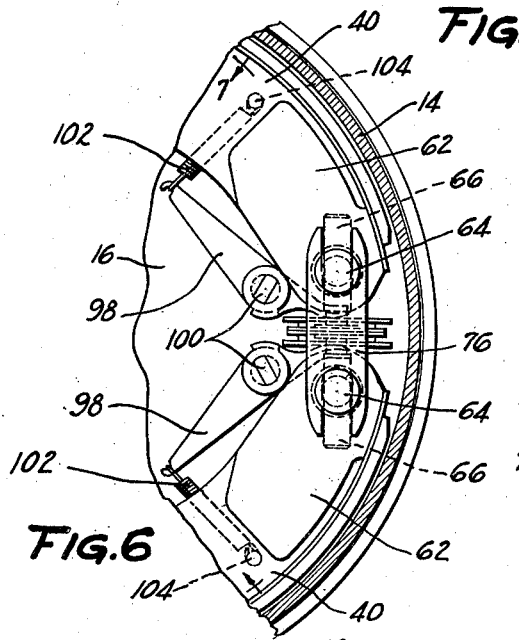
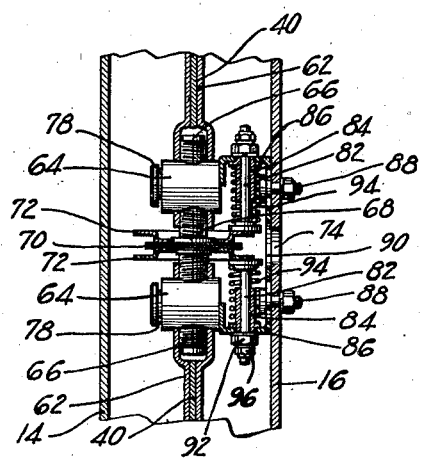
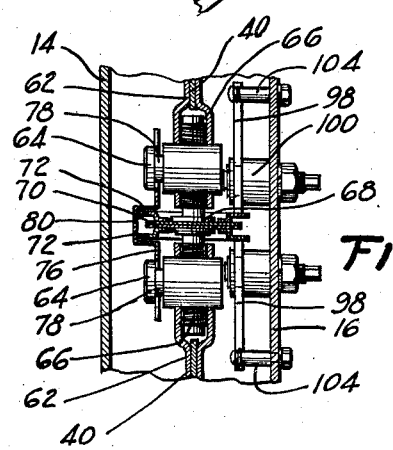
INVENTOR.
GEORGE H. HUNT
BY
*Jn. W. McConkey*
ATTORNEY Patented Mar. 23, 1937

2,074,727

UNITED STATES PATENT OFFICE 2,074,727

BRAKE

George H. Hunt, South Bend, Ind., assignor to Bendix Aviation Corporation, South Bend, Ind., a corporation of Delaware Application September 16, 1933, Serial No. 689,728

7 Claims. (Cl. 188—79.5)

This invention relates to brakes, and is illustrated as embodied in a four-wheel brake system having internal expanding wheel brakes of the shiftable anchorage type.

An object of the invention is to provide a simple and inexpensive adjusting device, preferably built up of a plurality of stamped disks, the outer ones of which have their peripheral portions offset away from each other to afford clearance for an adjusting tool. Preferably these offset portions are engaged by novel yielding centering means.

Another feature of the invention relates to the construction and arrangement of the parts of the centering means, especially in the embodiments having a pair of yieldingly mounted centering levers embracing between them a part of the adjustment such as the above-described disks. The levers may be pivoted on the backing plate as a support, or on a special support mounted on the backing plate and having at its ends novel abutments holding springs which act on the levers.

A further feature of the invention relates to a novel applying lever having a slideway receiving a device having brake-applying thrust parts engaging the shoes or their equivalents. This permits balancing the thrusts on the shoes, the slideway being approximately perpendicular to the brake radius when the brake is applied. Preferably the lever is pivotally mounted on the brake anchor.

The above and other objects and features of the invention, including various novel arrangements and desirable particular constructions, will be apparent from the following description of the illustrative embodiments shown in the accompanying drawings, in which:

Figure 1 is a diagrammatic perspective view of the four-wheel brake system;

Figure 2 is a section vertically through the left front brake, just inside the head of the brake drum, with the shoes shown in side elevation;

Figure 3 is a partial radial section on the line 3—3 of Figure 2, showing the brake anchor and the applying means;

Figure 4 is a partial section on the line 4—4 of Figure 2, at right angles to Figure 3, and also showing the brake anchor and the applying means;

Figure 5 is a partial section on the line 5—5 of Figure 2, showing the adjustable floating joint and the centering means;

Figure 6 is a partial sectional view corresponding to the right-hand part of Figure 2, and showing a modification in which centering levers are used;

Figure 7 is a partial section on the line 7—7 of Figure 6, corresponding generally to Figure 5 but showing the centering levers; and Figure 8 is a partial sectional view corresponding to Figures 5 and 7, but showing a third modification having levers generally perpendicular to the backing plate In the brake system illustrated in Figure 1, there are four novel brakes 10, one on each of the road wheels 12, and one of which is shown in detail in Figure 2. Each brake includes a drum 14 rotating with the wheel, and at the open side of which is a support such as a backing plate 16, the brake friction means being housed in between the drum and the backing plate. As shown in Figure 3, the drum may be formed, if desired, with internal spiral slots 18 across its braking surface, to keep the brake clear of dust, etc.

Each brake is applied by a Bowden-type control including a steel cable or the like 20 passing through the backing plate into the interior of the brake and there connected to a novel applying lever hereinafter described. Each cable has a portion housed in a flexible conduit 22, one end of the conduit being secured to the brake backing plate and the other end to the chassis frame 24.

The two cables 20 on each side of the vehicle (through suitable idler levers 25 in the case of the front cables) are connected to the lower end and to the center of an equalizer 26, the upper end of which is connected to an operating lever 28 on the end of a transverse shaft 30 operated by a pedal or the like 32. In the illustrated arrangement, intended for a truck, the rear wheels 12 support a dead axle 34 which is provided with a torque arm 36 connected by a ball-and-socket joint to a shackle link 38 which in turn is connected by a ball-and-socket joint to a cross member of the frame 24.

The brake illustrated in Figures 2 to 5 includes friction means comprising a pair of shoes 40, the left ends of which are formed with rounded notches to seat against opposite sides of an anchor or post 42. The shoes may have suitable steady rests 44 and an eccentric adjustable positioning stop 46, and a main return spring 48 is tensioned between them.

There may also be an auxiliary return spring 50, shown tensioned between the upper or secondary shoe 40 and the anchor 42, and which insures that the secondary shoe 40 will not leave the anchor 42 except in the case of reverse braking, in which case the drum friction overcomes the spring 50 and shifts the lower or primary shoe into anchored position.

The shoes are shown applied by a lever 52, pivoted at its lower end on the anchor 42 and connected at its upper end to the end of the cable 20. The lever 52 is formed with parallel shoulders 54, forming a slideway receiving a thrust member 56 having lugs or other thrust parts 58 engaging the ends of the shoe webs on opposite sides (radially) of the anchor 42.

The thrust member 56 has an elongated slot 60 embracing the anchor 42, and allowing the thrust member to shift on the lever in the direction of the shoulders 54 and the slot 60. When the brake is applied, this direction is approximately perpendicular to the brake radius passing through the anchor 42, so that the thrust member may shift to balance its thrust on the two shoes.

The applying means described above is claimed in my divisional application No. 66,331, filed February 29, 1936.

The opposite ends of the shoes are shown provided with pairs of stamped plates 62 spot-welded or otherwise secured to the sides of the shoe webs, and which are formed with registering grooves which (with slots in the shoe webs) form sockets extending into the ends of the shoes to receive the ends of the adjusting device described below.

The plates 62 are also formed with aligned openings, in which are journaled transverse pivots 64, formed with central openings therethrough which are threaded to receive the ends of a right-and-left threaded adjusting and connecting member 66.

On a collar 68 at the center of the adjusting member, there are pressed a series of stamped disks, shown as two center disks 70 and two outer disks 72. The two center disks 70 are formed at their edges with teeth adapted to be engaged by an adjusting tool inserted through an opening 74 in the backing plate. The two outer disks 72 are offset away from each other at their peripheries, for engagement with the novel centering means described below. The entire adjusting device may be locked against unintended turning by means such as a resilient plate 76 slotted at its ends to be mounted in grooves 78 at the ends of the pivots 64, and having at its center a part 80 resiliently frictionally engaging the edges of the stamped disks 70 and 72.

In the arrangement of Figures 1–5, the brake friction means is centered when the brake is released by novel yielding centering means including plungers 82 having heads engaging the offset peripheries of stampings 72. The stems of the plungers slide in guides 84 mounted in a stamped support 86 secured to the backing plate by means such as bolts 88 passing through slots in the support. The support is formed with an opening 90 registering with the opening 74. The guides 84 are shown with flanges engaging the ends of the support 86, and are threaded at their ends to receive nuts 92 by which they are clamped in place.

Centering springs 94, shown as coil compression springs, are sleeved on the stems of plungers 82, and are confined between the heads of the plungers and the flanges on the guides 84. The tension of springs 94 may be adjusted by means of nuts 96 threaded on the ends of the stems of plungers 82, and which are urged by the springs 94 against the ends of the guides 84. In this embodiment, the ends of the pivots 64 are slidably guided by the ends of the support 86.

In Figures 6 and 7, in lieu of the plungers 82, there are two levers 98, mounted on pivots 100 carried by the backing plate, and the ends of which embrace between them the stampings at the center of the adjusting device. Centering springs 102 are tensioned between the other ends of the levers and posts 104 carried by the backing plate. The pivots 100 are shown with eccentric portions on which the levers 98 are mounted, so that the levers may be shifted from outside the backing plate by turning the pivots.

In the arrangement of Figure 8, there is a support 106, mounted on the backing plate by means such as machine screws 108, and formed with abutments 110 at its ends. Centering levers 112, pivoted on support 106, extend generally parallel to the brake axis (i. e. generally perpendicular to the backing plate) and embrace the stamped disks between them. Compression centering springs 114 are confined between the levers 112 and the abutments 110.

While several illustrative embodiments have been described in detail, it is not my intention to limit the scope of the invention to those particular embodiments, or otherwise than by the terms of the appended claims.

I claim:

1. A brake having a pair of floating shoes having a floating connection including a threaded adjusting member extending along a chord of the brake across the space between the shoe ends, a plurality of stamped disks secured to the center of the adjusting member and the two outside ones of which have their peripheral portions offset away from each other to permit access to the rim of the center disk by an adjusting tool, and centering means acting on said offset peripheral portions.

2. A brake having a pair of floating shoes having a floating connection including a threaded adjusting member extending along a chord of the brake across the space between the shoe ends, and a plurality of stamped disks secured to the center of the adjusting member and the two outside ones of which have their peripheral portions offset away from each other to permit access to the rim of the center disk by an adjusting tool.

3. A brake having a pair of floating shoes having a floating connection including a threaded adjusting member extending along a chord of the brake across the space between the shoe ends, a plurality of stamped disks secured to the center of the adjusting member and the two outside ones of which have their peripheral portions offset away from each other to permit access to the rim of the center disk by an adjusting tool, and opposed yielding plungers engaging said offset peripheral portions respectively and yieldingly centering said connection.

4. A brake having a pair of floating shoes having a floating connection including a threaded adjusting member extending along a chord of the brake across the space between the shoe ends, a plurality of stamped disks secured to the center of the adjusting member and the two outside ones of which have their peripheral portions offset away from each other to permit access to the rim of the center disk by an adjusting tool, and opposed members engaging said offset peripheral portions respectively and having springs operating them for centering said connection.

5. A brake having a pair of floating shoes connected by a joint having an adjustment provided with operating means including a plurality of stamped disks, the two outside ones of which have their peripheral portions offset away from each other to afford clearance between them for an adjusting tool, and a pair of yieldingly mounted centering levers operatively engaging said offset portions respectively.

6. A brake having a backing plate carrying a pair of floating shoes connected by a joint having an adjustment provided with operating means including a plurality of stamped disks, the two outside ones of which have their peripheral portions offset away from each other to afford clearance between them for an adjusting tool, a pair of centering levers pivoted on the backing plate and operatively engaging said offset portions respectively, and a spring tensioned between each lever and the backing plate.

7. A brake centering device comprising a support adapted to be mounted on a brake backing plate and having inwardly-projecting abutments at its ends, a pair of levers pivoted on said support and extending in the same direction as said abutments, and a spring arranged between each lever and the corresponding abutment.

GEORGE H. HUNT.